(12) United States Patent
Shah et al.

(10) Patent No.: US 6,553,425 B1
(45) Date of Patent: Apr. 22, 2003

(54) SYSTEM AND METHOD FOR BREADTH FIRST ASYNCHRONOUS EXPANSION OF DISTRIBUTION LISTS WITH THROTTLING

(75) Inventors: Milan M. Shah, Issaquah, WA (US); Jeffrey C. Stamerjohn, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/461,915

(22) Filed: Dec. 15, 1999

(51) Int. Cl.[7] ............................................... G06F 15/16
(52) U.S. Cl. ........................................ 709/245; 709/206
(58) Field of Search ................................ 709/245, 204, 709/206, 209; 707/10; 345/752, 809; 385/15; 455/412

(56) References Cited

U.S. PATENT DOCUMENTS

| | | | | |
|---|---|---|---|---|
| 5,822,526 A | * | 10/1998 | Waskiewicz | ................ 709/206 |
| 5,930,471 A | * | 7/1999 | Milewski et al. | ........... 709/204 |
| 6,035,326 A | * | 3/2000 | Miles et al. | ................ 709/206 |
| 6,057,841 A | * | 5/2000 | Thurlow et al. | ............ 345/809 |
| 6,058,233 A | * | 5/2000 | Dragone | ...................... 385/15 |
| 6,374,292 B1 | * | 4/2002 | Srivastava et al. | .......... 709/206 |
| 6,396,513 B1 | * | 5/2002 | Helfman et al. | ............. 345/752 |
| 6,424,966 B1 | * | 7/2002 | Meyerzon et al. | ............ 707/10 |
| 2002/0025798 A1 | * | 2/2002 | Titmuss et al. | ............. 455/412 |

* cited by examiner

Primary Examiner—Kenneth R. Coulter
Assistant Examiner—Hai V. Nguyen
(74) Attorney, Agent, or Firm—Workman, Nydegger & Seeley

(57) ABSTRACT

The present invention is a technique for doing an asynchronous, breadth-first expansion of e-mail distribution lists, while being able to control the amount of resources needed to complete the expansion operation. The breadth first DL expansion technique described here correctly handles circular references while expanding distribution lists asynchronously, in a breadth-first fashion, and without requiring large amount of resources. The present invention provides a mechanism to control how many lookup requests are performed in parallel and the maximum amount of memory resources required to complete the DL expansion.

9 Claims, 7 Drawing Sheets

SYSTEM AND METHOD FOR BREADTH FIRST ASYNCHRONOUS EXPANSION OF DISTRIBUTION LISTS WITH THROTTLING

BACKGROUND OF THE INVENTION

1. The Field of the Invention

The present invention relates to electronic communications. Specifically, the present invention relates to methods, computer program products and systems for breadth-first, asynchronous expansion of distribution lists with throttling control.

2. The Prior State of the Art

E-mail systems typically use a directory service (sometimes hereinafter referred to as the "DS") or database to look up the locations of mailboxes of intended recipients specified in an e-mail message. Typically, two types of records are recognized—mailboxes and distribution lists. A mailbox record directly specifies the location, in terms of an exact storage location on a specified server, of the mailbox itself. Sending e-mail to a mailbox recipient has the effect of delivering the mail to the specified storage location.

On the other hand, a distribution list (sometimes referred to hereinafter as a "DL") is an e-mail recipient that is actually a list of mailbox recipients and/or other distribution lists. A distribution list is a data record kept in a directory service or a database, wherein the data record has an attribute that represents the members of the distribution list. The members are represented as pointers to other records in the directory service or database. The pointers can be to mailbox records or other distribution lists. Sending e-mail to a distribution list has the effect of sending e-mail to all members of that list.

To identify all of the mailbox recipients contained in a particular distribution list, requires expansion of the distribution list. And since distribution lists can also contain other distribution lists as members, any method used to expand a distribution list must also be capable of handling the situation of a circular reference. As shown in FIG. 1, distribution lists can be graphically represented as a tree, wherein the individual members of the distribution list are related to one another in a hierarchical fashion.

Most e-mail systems found in the prior art use a "depth-first" method of expanding distribution lists. In simple terms, this means the system resolves each branch of a distribution list tree until it reaches a leaf node before proceeding on to a different branch of the distribution list tree. The current algorithm for expanding DLs in a depth-first manner is:

Procedure Expand(Record record, Stack parents)
Begin
   DirectoryService.Lookup (record);
   If (record.type==mailbox)
     Save(record.storage Location);
     return;
   End If
   parents.push(record);
   For each records.member
     If (not parents.find(record.member[I]))
       Expand(record.member, parents)
     Else
       //circular loop—do nothing
       return;
   End For
End Procedure The foregoing algorithm has the characteristic that the directory service lookup operation ("DirectoryService.Lookup") happens once for each member of a distribution list, and the next lookup operation will not occur until the current lookup operation has finished and returned the data record. In the event that the directory service is located on a different server than the server of the e-mail system, the lookup operation may have a high latency. If this latency were x seconds per lookup, the algorithm set forth above would require n*x seconds to complete the expansion of the entire distribution List, where n is the number of members. However, depth-first has the advantage of being relatively efficient in terms of the amount of system resources necessary to complete an expansion process. As a general rule, the amount of system resources needed to complete a depth-first expansion is proportional to $\log_n$, where n is the number of members in the distribution list.

Another possible method of expanding a distribution list is "breadth-first" expansion. In simple terms, breadth-first expansion means that each level of a distribution list tree is completely resolved before proceeding to the next level of the distribution list tree. This method has some advantages over depth-first expansion in that it allows multiple records to be batched together and sent as a single lookup operation, thereby reducing the number of separate lookup operations and, therefore, reducing the total time required to complete the expansion operation. Unfortunately, doing this in a simplistic fashion will cause a large amount of resources (in terms of the stack objects required to keep track of parents for each DL that is being expanded) to be allocated. As a general rule, the system resources needed to complete a breadth-first expansion can be as great as $n^2$, the square of the number of members in the distribution list.

Therefore, what is needed is an efficient method of expanding distribution lists that can be optimized in terms of speed and the amount of resources needed to complete the operation.

SUMMARY AND OBJECTS OF THE INVENTION

The present invention is a technique for doing an asynchronous, breadth-first expansion of e-mail distribution lists, while being able to control the amount of resources needed to complete the expansion operation. The breadth first DL expansion technique described here correctly handles circular references while expanding Distribution Lists asynchronously, in a breadth-first fashion, and without requiring large amount of resources.

The method for breadth first expansion of a DL consists mainly of a priority queue. The method begins by examining a piece of e-mail for all intended recipients. A lookup request is inserted into the priority queue for each recipient specified in the e-mail message. The priority of these requests is set to the lowest priority (i.e., lowest numerical value) possible for the queue. None, some, or all of these recipients can be DLs.

A connection manager module manages connections to a directory service and is responsible for sending lookup requests and processing the responses. The connection manager pulls requests from the priority queue in priority order (i.e., requests with the largest numerical value are pulled first). It then combines a predetermined number of individual requests into one large request and sends it off to the directory service. It continues to pull requests from the priority queue until the maximum number of pending requests is hit, at which point it stops. This provides a throttling control on the process.

When the DS returns the results of the search request, the combined response is split apart by the connection manager. If the result indicates that a lookup request resulted in finding a final recipient (i.e., a mailbox recipient), then information about that recipient is recorded in the e-mail message itself. If the result indicates that the request was for a distribution list or a user with a forwarding address, then a new lookup for each of the members of the distribution list or the forwarding address is inserted into the priority queue. The priority of this subsequent request is incremented to be higher than its previous priority. Also, a stack is allocated, and the original request is inserted as a parent, and is associated with the new lookup request.

When a result is returned by the DS and a stack is associated with its request, the stack is checked to see if the result is already present in the stack. If so, then this indicates a circular DL or forwarding address loop, and this loop detection is recorded in the e-mail recipient.

The combination of throttling mechanism and priority queue provides the mechanism to control how many lookup requests are performed in parallel and the maximum amount of memory resources required to complete the DL expansion.

It is, therefore, a primary object of the invention to provide improved methods, computer program products and systems for expanding distribution lists. Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to systems and methods for breadth-first, asynchronous expansion of distribution lists with throttling control. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store the desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
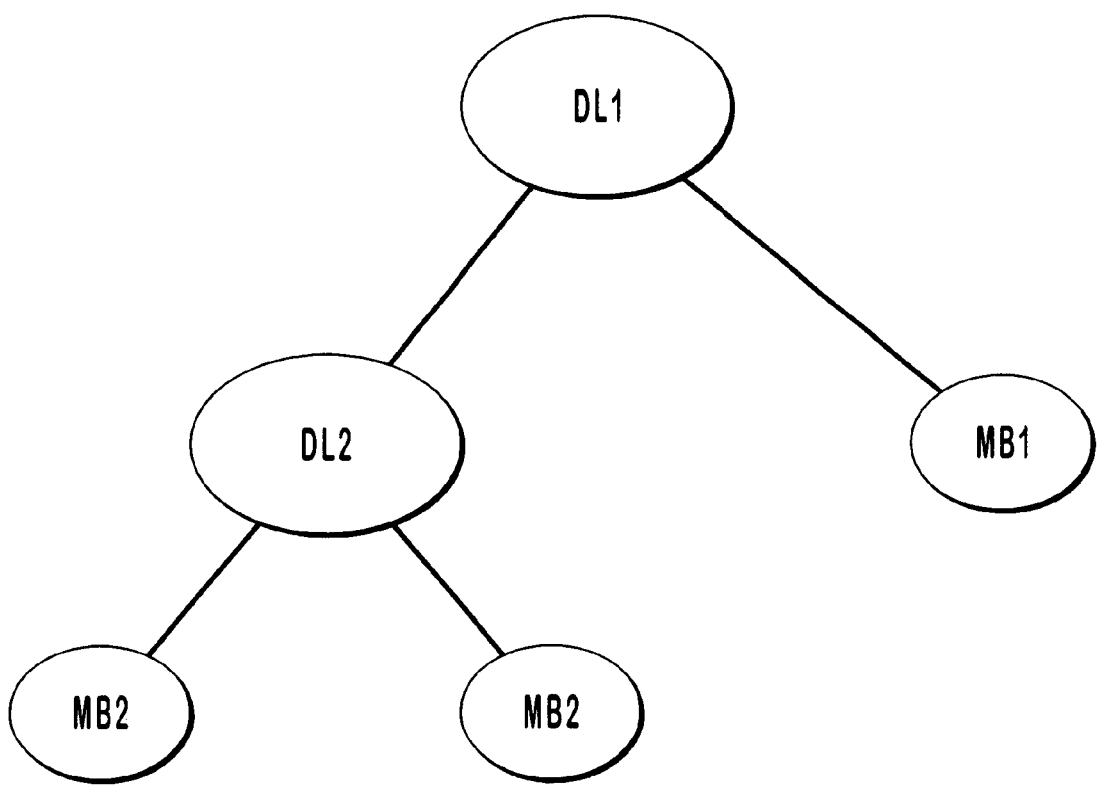
FIG. 1 is a simple distribution list represented in the form of a tree diagram.
Figure 2:
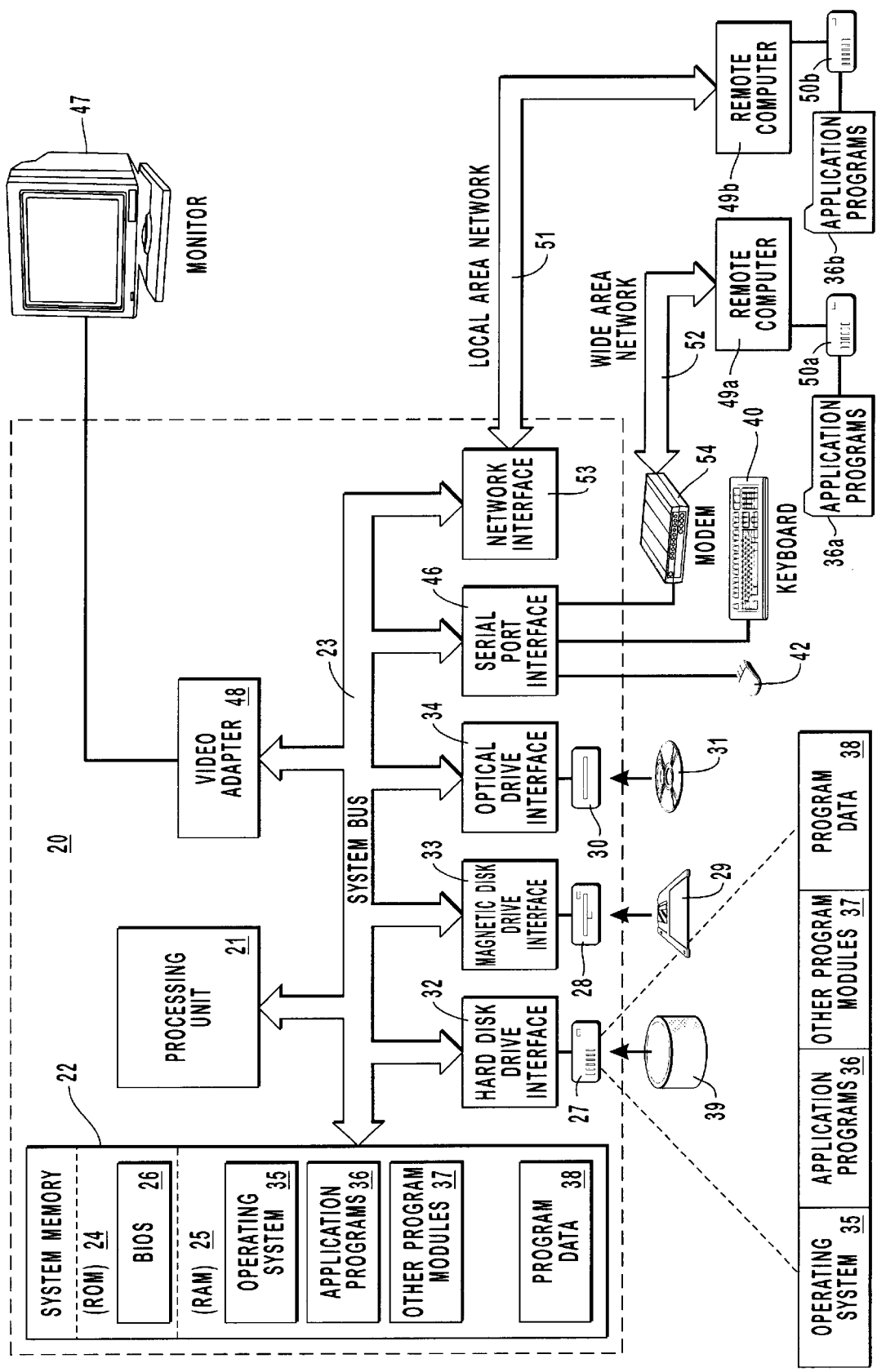
FIG. 2 illustrates an exemplary system that provides a suitable operating environment for the present invention.

FIG. 2 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 2, an exemplary system for implementing the invention includes a general purpose computing device in the form of a computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computers 49a and 49b. Remote computers 49a and 49b may each be another personal computer, a server, a router, a network PC, a peer device or other common network node, and typically includes many or all of the elements described above relative to the computer 20, although only memory storage devices 50a and 50b and their associated application programs 36a and 36b have been illustrated in FIG. 2. The logical connections depicted in FIG. 2 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 typically includes a modem 54, a wireless link or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Within the context of the system described above, the present invention provides improved methods, computer program products and systems for expanding email distribution lists. As discussed and illustrated in more detail below, the methods of the present invention generally comprise the following steps: (a) generating a directory service lookup request for the root of the distribution list, wherein the lookup request is assigned a lowest priority, and placing the directory service lookup request in the directory service request queue; (b) pulling up to a predefined number of directory service lookup requests from the directory service request queue and transmitting them to the directory service for processing, wherein the predefined number of directory service lookup requests are pulled from the directory service request queue in the order of their assigned priorities; (c) analyzing the results returned by the directory service in response to the predefined number of directory service lookup requests and, for each mailbox recipient returned by the directory service in response to the previous predefined number of directory service lookup requests, saving each such mailbox recipient and, for each other distribution list returned by the directory service in response to the previous predefined number of directory service lookup requests, performing circular reference detection and discarding the other distribution list if a circular reference is detected; (d) generating, for each other distribution list returned by the directory service in response to the predefined number of directory service lookup requests, a new directory service lookup request, wherein the new directory service lookup request is assigned a priority equal to one level higher than the priority associated with the previous lookup request in response to which the other distribution list was returned; and repeating steps (b) through (e) until all mailbox recipients included in the root distribution list have been determined and saved.

Figure 3:
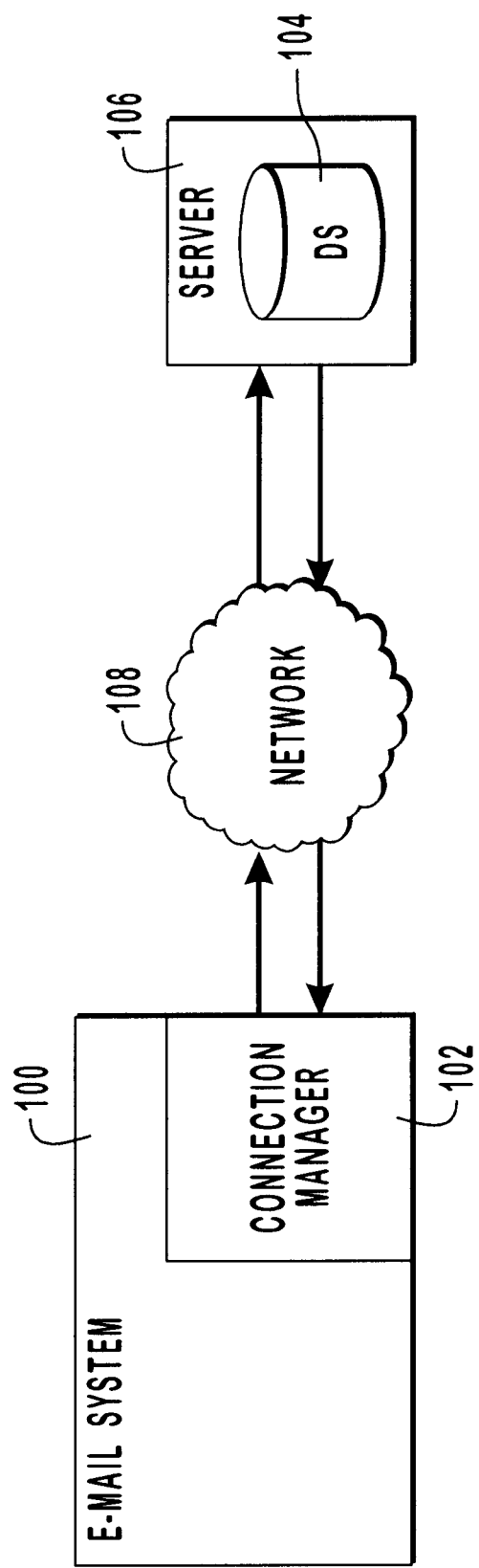
FIG. 3 is a functional block diagram of the present invention.

Referring now to FIG. 3, the present invention includes an e-mail server 100, which includes a connection manager 102. Connection manager 102 manages communications between the e-mail server 100 and the directory service 104. The directory service 104 may be physically located within the same computer as the e-mail server 100 or, as illustrated in FIG. 3, the directory service 104 may be physically located on a separate server 106 and may be logically connected to e-mail server 100 via a network 108. The particular physical arrangement and connection of these components, as well as the particular type of network (i.e., local area network, wide area network, internet, etc.) are not critical to the present invention, but are discussed simply for purposes of illustration.

As will be explained in more detail below, connection manager 102 includes a DS request queue, in which pending directory service lookup requests are queued up for transmission to directory service 104. In accordance with one presently preferred embodiment, connection manager 102 will combine one or more directory service lookup requests and to transmit the multiple requests in a single batch for processing by directory service 104. The methods of the present invention allow a system administrator to designate and modify the maximum number of directory service lookup requests that connection manager 102 is allowed to combine into a single batch. Setting this predefined limit to a relatively high number will reduce the number of separate, sequential calls that may need to be made to directory service, which potentially speeds up the expansion process, but will also potentially require more resources. On the other hand, setting this predefined limit to a relatively low number will help conserve system resources, but may also potentially slow down the expansion process.

The method of the present invention begins with e-mail server 100 examining a particular piece of e-mail, which includes a list of intended recipients. As discussed above, most e-mail systems support the creation and use of distribution lists, which comprise a list intended recipients and which may include one or more specific mailbox recipients and/or one or more other distribution lists. Before e-mail server 100 can transmit the e-mail message to all intended recipients, the identity and addresses of all intended recipients must first be determined. To do so, the e-mail server sends a directory service lookup request to the directory service to request the address of each intended recipient specified in the e-mail message. If a particular e-mail message specifies only mailbox recipients, then the directory service returns to the e-mail server the specific address for each mailbox recipient, and the email server then saves the specific mailbox addresses as part of the e-mail message and then transmits the e-mail message. However, if the e-mail message specifies a distribution list as an intended recipient, the distribution list must first be expanded to determine all of the mailbox recipients that are included in the distribution list.

Figure 4:
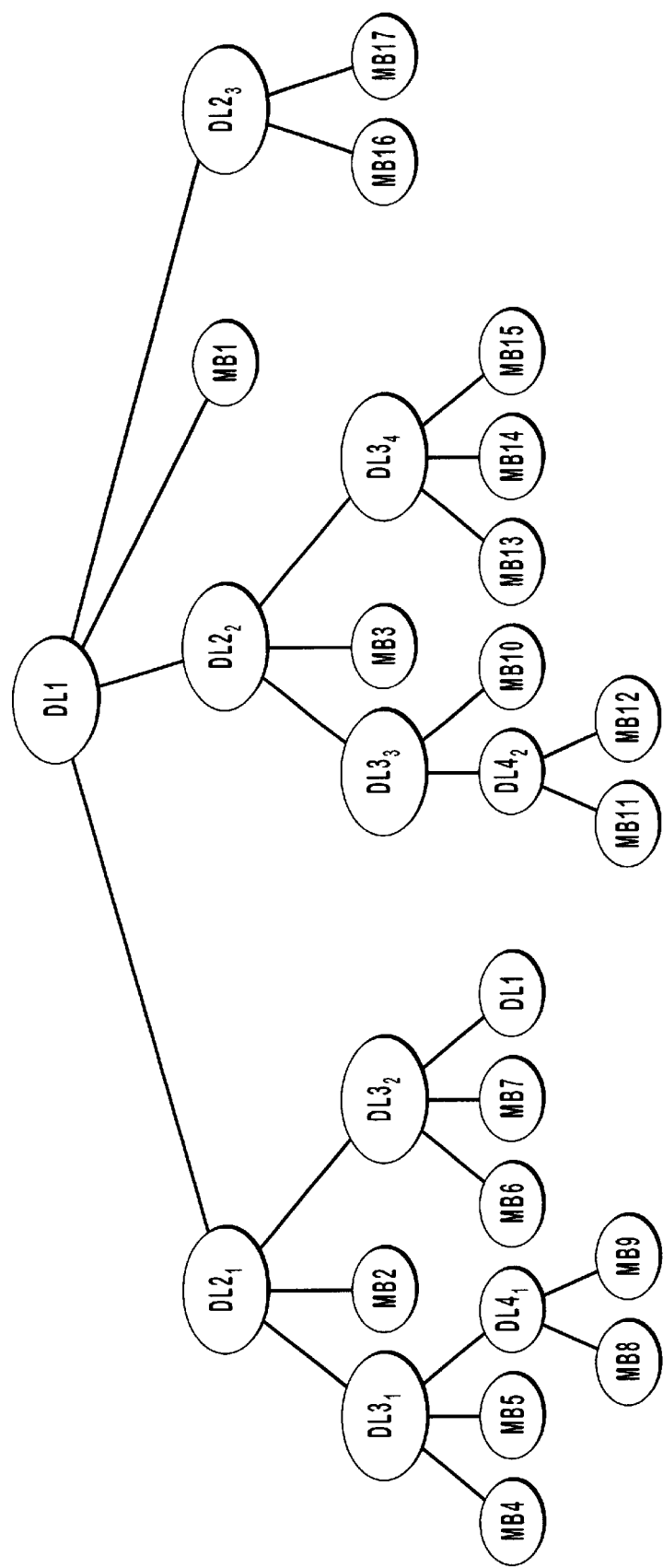
FIG. 4 is another distribution list represented in the form of a tree diagram.

Reference is now made to FIG. 4, which illustrates a distribution list DL1, represented in the form of a tree diagram. It should be understood that DL1 is simply one representative example of a distribution list, which has been arbitrarily selected to illustrate the principles and features of the present invention. As shown in FIG. 4, DL1 specifies four members $DL2_1$, $DL2_2$, MB1 and $DL2_3$. For purposes of this discussion, members labeled as "DL" are intended to represent a distribution list, and members labeled as "MB" are intended to represent a mailbox recipient. Therefore, DL1 includes as its members three other distribution lists, $DL2_1$, $DL2_2$ and $DL2_3$, and one mailbox recipient MB1. $DL2_2$, in turn includes members $DL3_1$, MB2 and $DL3_2$, and so on and so forth. The individual members of distribution list DL1 are hierarchically related in a parent-child relationship. As will be demonstrated in detail below, the single reference to DL1, once fully expanded, ranslates into reference to 17 separate and distinct mailbox recipients.

Assume, for the sake of discussion, that e-mail server 100 receives a piece of e-mail that specifies distribution list DL1 as an intended recipient. E-mail server 100, via connection manager 102, sends a directory service lookup request to directory service 104, requesting the identity of the members that make up distribution list DL1. In accordance with the present invention, the connection manager 102 prioritizes each directory service lookup request and sends the requests in order of priority. For purposes of this discussion, the higher the priority number assigned to a particular request, the higher the priority. Because DL1 happens to be the root of the tree, the connection manager 102 will assign a priority of 1 to the initial request.

Figure 5A:
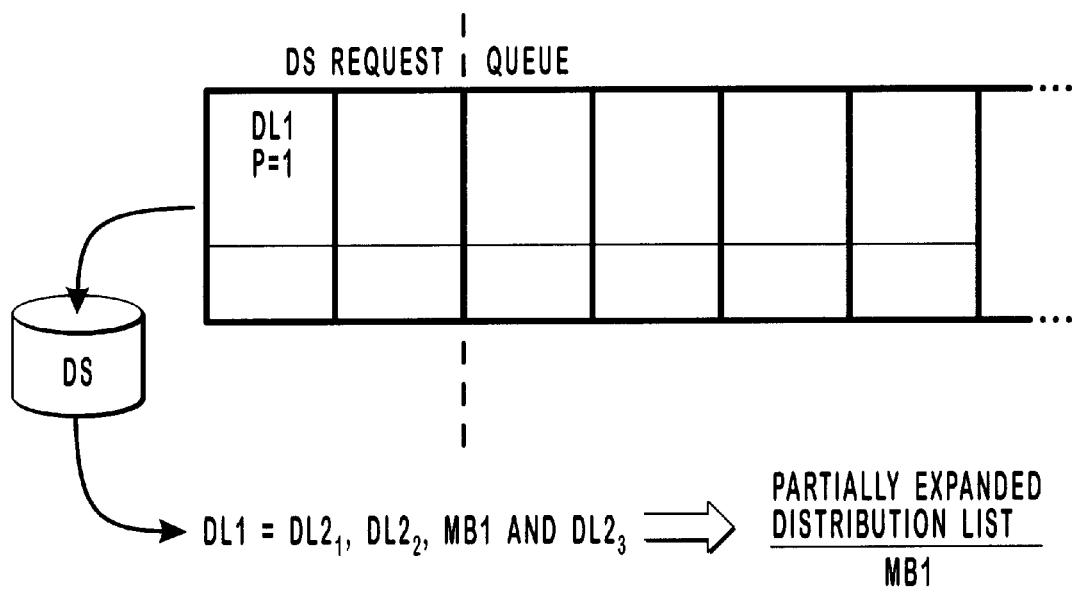
FIGS. 5A–5F are block diagrams used to graphically illustrate the method steps of the present invention.
Figure 5B:
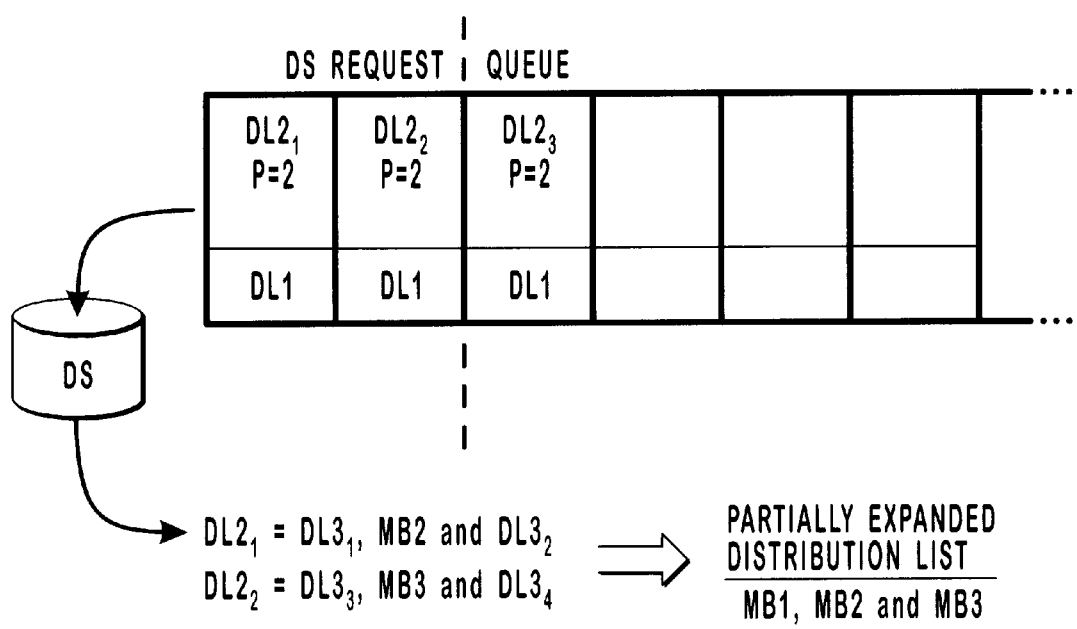

As graphically illustrated in FIG. 5A, the connection manager 102 sends the directory service lookup request to directory service 104, which determines the identity of the members of distribution list DL1 and returns the results. In this example, the results indicate that distribution list DL1 refers to $DL2_1$, $DL2_2$, MB1 and $DL2_3$. The connection manager then examines each of the returned items. If the returned item is a mailbox recipient, as in the case of MB1, then the connection manager saves the address of MB1 as part of the e-mail message. On the other hand, if a returned item is another distribution list, as in the cases of $DL2_1$, $DL2_2$ and $DL2_3$, then the connection manager creates another directory service lookup request for each of the returned distribution lists $DL2_1$, $DL2_2$ and $DL2_3$ and, as illustrated in FIG. 5B, places the new lookup requests in the DS request queue. As further illustrated in FIG. 5B, the connection manager also creates a stack for each of these requests, in which DL1 is associated with each such request, indicating that DL1 is the parent of each of distribution lists $DL2_1$, $DL2_2$ and $DL2_3$.

As discussed above, a feature of the present invention is that it allows the administrator to control the amount of system resources used to expand a distribution list by limiting the number of directory service lookup requests that are batched together by connection manager 102 and, therefore, processed together by directory service 104. The present invention permits a system administrator to vary this number so as to achieve, for a particular system, an optimal balance between the speed of the expansion process versus the amount of system resources needed to complete the expansion process. The higher the number of individual directory service lookup requests that are allowed to be batched together, the faster the expansion process works and the greater the amount of system resources required. Conversely, the lower the number of individual directory service lookup requests that are allowed to be batched together, the slower the expansion process works and the smaller the amount of system resources required. For purposes of this discussion, this predefined limit for the number of requests to be batched together by connection manager 102 was arbitrarily selected to be set at two.

Figure 5C:
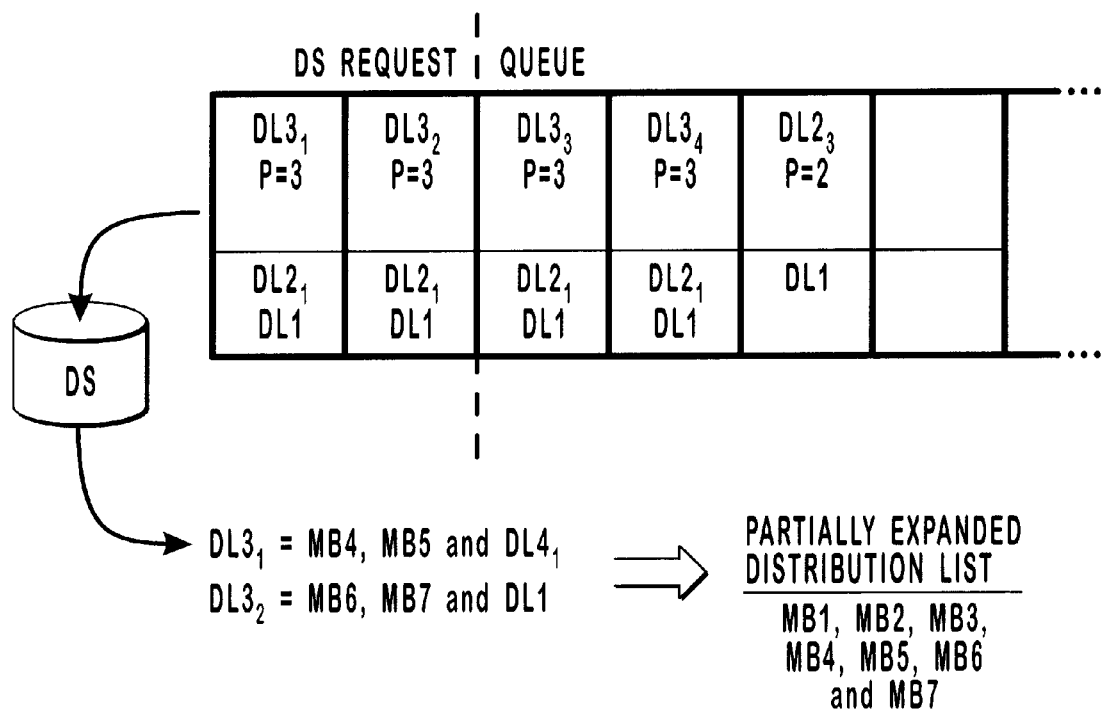

Referring again to FIG. 5B, following the processing by connection manager 102 of the results returned by directory service 104 in the previous step, the DS request queue will contain three new directory service lookup requests, one for each of $DL2_1$, $DL2_2$ and $DL2_3$. Because these requests relate to the second level, as indicated by the presence of DL1 in the stack associated with each such request, the priority of these requests will be incremented, resulting in a priority equal to two (P=2) for each such request. Connection manager 102 then pulls out the first two of the highest priority requests currently in the queue (i.e., $DL2_1$ and $DL2_2$) and transmits a directory service lookup request for $DL2_1$ and $DL2_2$. After performing the lookup operation, directory service 104 returns the results to connection manager 102, indicating that the members of $DL2_1$ are $DL3_1$, MB2 and $DL3_2$ and that the members of $DL2_2$ are $DL3_3$, MB3 and $DL3_4$. Again, connection manager 102 scans the results returned by directory service 104 and saves the addresses of any mailbox recipients (i.e., MB2 and MB3) returned by directory service 104 in response the previous requests. In addition, connection manager 102 generates new directory service lookup requests for each new distribution list (i.e., $DL3_1$, $DL3_2$, $DL3_3$ and $DL3_4$) returned by directory service 104 in response the previous requests and, as illustrated in FIG. 5C, places these new requests in the DS request queue. Here, again, connection manager 102 adds $DL2_1$ the stack of the new requests for $DL3_1$ and $DL3_2$ and adds $DL2_2$ to the stack of the new requests for $DL3_3$ and $DL3_4$, and increments the priority (P=3) associated with each of these new requests.

Figure 5D:
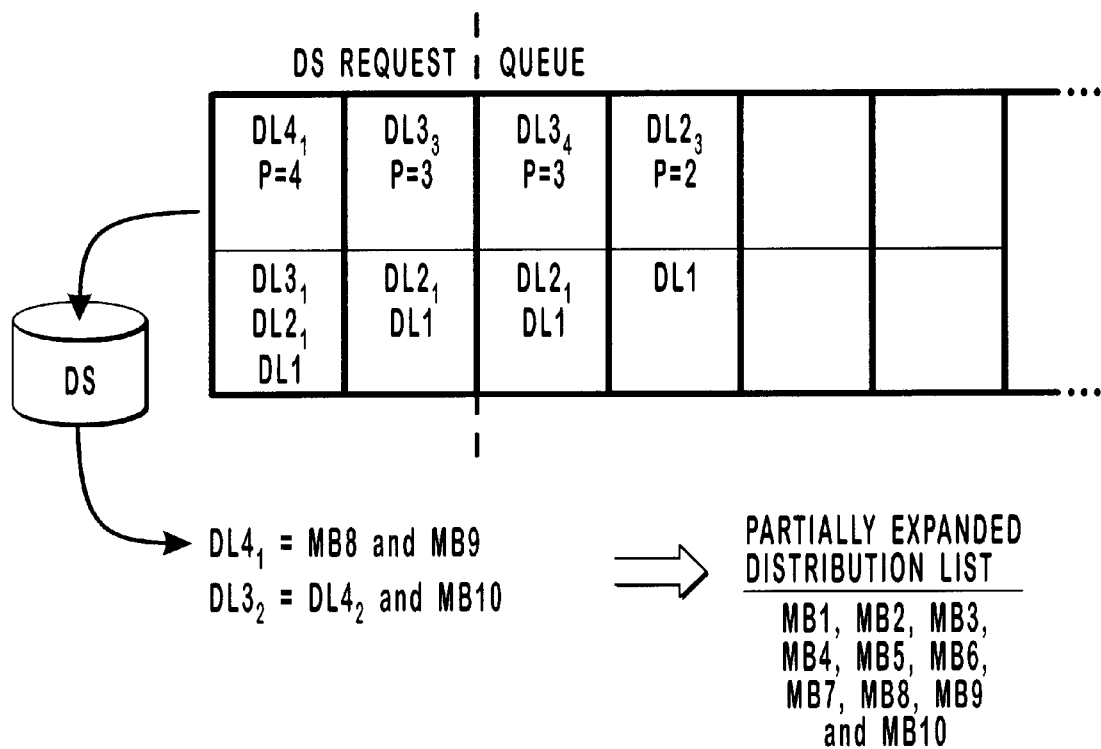

Referring again to FIG. 5C, it will be seen that the request for $DL2_3$ appears at the end of the DS request queue. This is due to the fact that the priority of the request for $DL2_3$ (P=2) is lower than the priority of the requests for $DL3_1$, $DL3_2$, $DL3_3$ and $DL3_4$ (P=3). The process continues with connection manager 102 pulling from the DS request queue the next two requests having the highest priority (i.e., the requests for $DL3_1$ and $DL3_2$) and transmitting directory service lookup requests for those two distribution lists. As illustrated in FIG. 5C, directory service 104 returns the results of the lookup operation to connection manager 102, indicating that $DL3_1$ consists of members MB4, MB5 and $DL4_1$ and that $DL3_2$ consists of members MB6, MB7 and DL1. Connection manager 102 again examines the returned results, and saves any mailbox recipients as part of the e-mail. Following this operation, as further shown in FIG. 5C, the partially expanded distribution list will comprise mailbox recipients MB1 through MB7. Connection manager 102 then examines any new distribution lists returned by directory service 104 and compares them to the stacks associated with their corresponding requests for loop detection. In this case, the lookup request for $DL3_2$ reveals that one of the members of $DL3_2$ is DL1, which also appears in the stack associated with the lookup request for $DL3_2$. This indicates a distribution list loop and, therefore, connection manager 102 simply discards or ignores this recurrence of DL1. Connection manager 102 then creates another directory service lookup request for $DL4_1$, inserting $DL3_1$ in the stack and incrementing the priority (P=4) associated with the $DL4_1$ request, and places the new request in the DS request queue. Because the priority of the $DL4_1$ request has the highest priority of any of the requests currently in the queue, the $DL4_1$ request immediately moves the front of the queue, as illustrated in FIG. 5D.

Figure 5E:
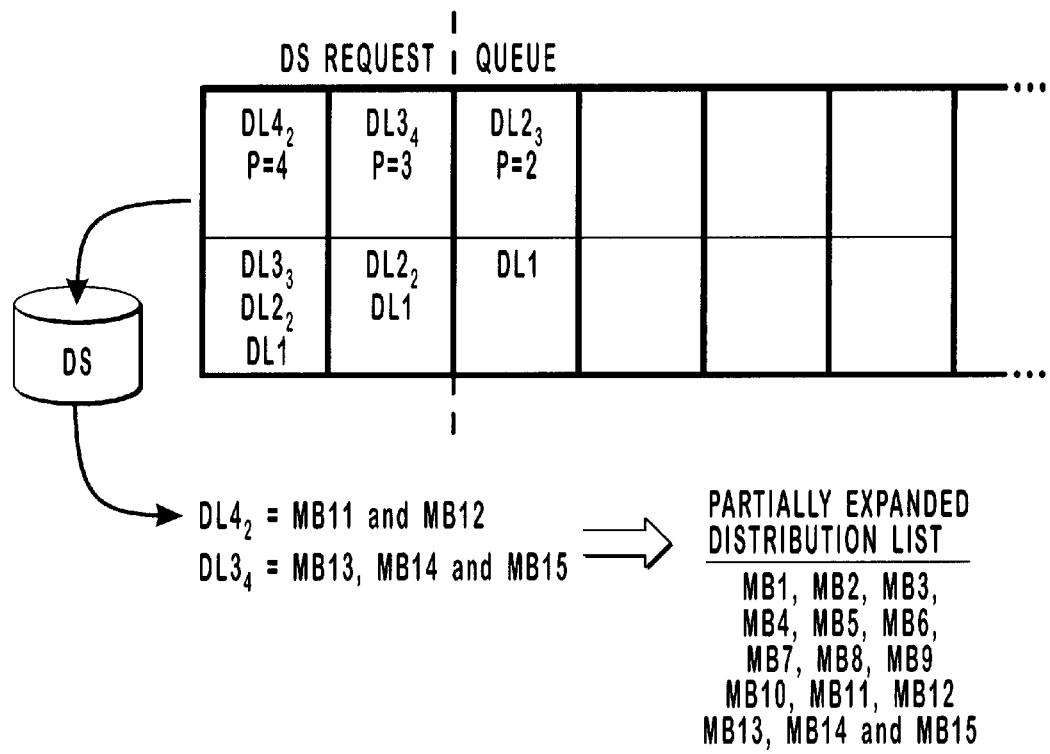
Figure 5F:
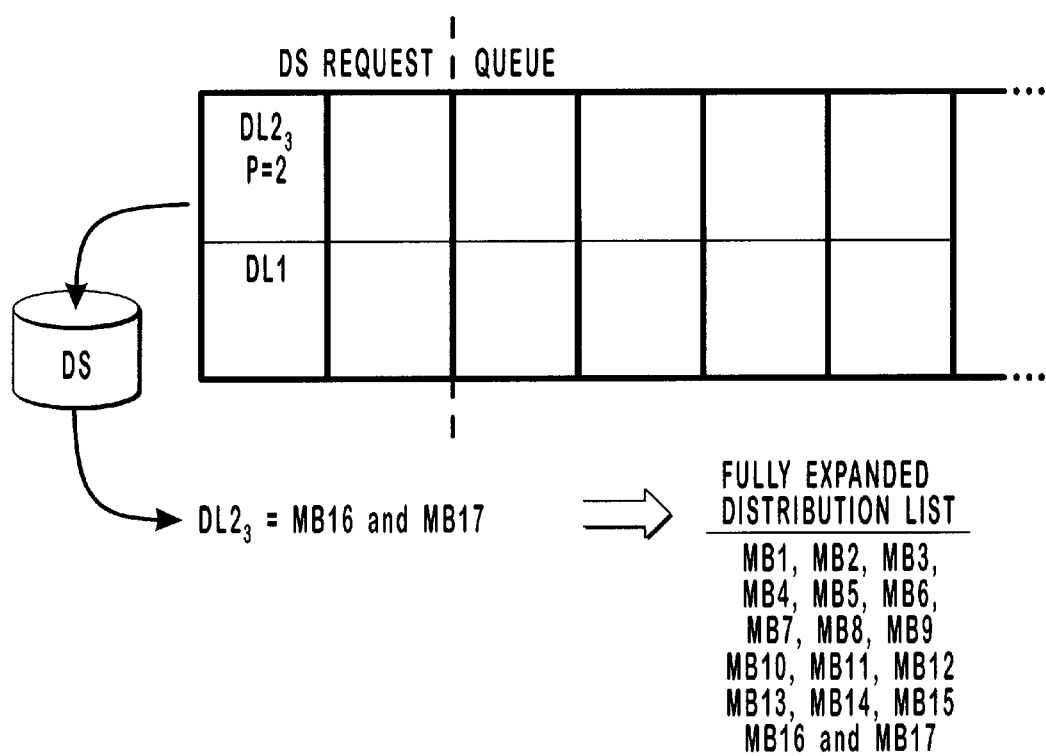

Connection manager 102 again pulls from the DS request queue the next two requests having the highest priority (i.e., $DL4_1$ and $DL3_3$) and transmits directory service lookup requests to directory service 104, which performs the lookup operation and returns the results. In this case, the lookup operation reveals that $DL4_1$ consists of members MB8 and MB9, and that $DL3_3$ consists of members $DL4_2$ and MB10. Connection manager 102 processes the returned results and saves the addresses for MB8, MB9 and MB10 as part of the e-mail message. At this point, the partially expanded distribution list DL1 comprises mailbox recipients MB1 through MB10. Connection manager 102 also compares $DL4_2$ with the stack associated with the $DL3_2$ request for loop detection. Connection manager 102 then creates a new directory service lookup request for $DL4_2$, adding $DL3_2$ to the stack and incrementing the priority (P=4) and placing the new request in the DS request queue, as illustrated in FIG. 5E. Again, since $DL4_2$ request has a priority (P=4) that is higher than any of the other requests already in the queue, the $DL4_2$ request immediately moves to the front of the queue.

Connection manager 102 again pulls from the DS request queue the next two requests having the highest priority (i.e., $DL4_2$ and $DL3_4$) and transmits directory service lookup requests to directory service 104, which performs the lookup operation and returns the results. In this case, the lookup operation reveals that $DL4_2$ consists of members MB11 and MB12, and that $DL3_4$ consists of members MB13, MB14 and MB15. Connection manager 102 processes the returned results and saves the addresses for MB11 through MB15 as part of the e-mail message. At this point, the partially expanded distribution list DL1 comprises mailbox recipients MB1 through MB15.

Finally, connection manager 102 pulls the last request remaining in the DS request queue (i.e., $DL2_3$) and transmits a directory service lookup request to directory service 104, which performs the lookup operation and returns the results.

In this case, the lookup operation reveals that $DL2_3$ consists of members MB16 and MB17. Connection manager 102 processes the returned results and saves the addresses for MB16 and MB17 as part of the e-mail message. This completes the expansion process and the fully expanded distribution list for DL1 consists of mailbox recipients MB1 through MB17.

If the predefined limit for the number of directory service lookup requests that are to be batched together were set at one, the methods of the present invention described above would result in a purely depth-first expansion operation commonly found in the prior art. At the other extreme, if the predefined limit of directory service lookup requests that are to be batched together were set at infinity, the methods of the present invention would result in a purely breadth-first expansion of the distribution list. Setting the predefined limit somewhere between one and infinity results in a hybrid operation that is part breadth-first and part depth-first.

Permitting this predefined limit to be specified and varied allows system administrators to fine tune the expansion operation based on the particular system, its configuration and available resources. For example, if a particular system has a relatively low latency associated with directory service lookup operations, then multiple, successive directory service lookup operations may not pose a serious performance issue. If that same system also has limited system resources, then the need to conserve system resources also probably outweighs the need to batch multiple directory service lookup requests together. Therefore, the predefined limit may be set relatively low.

The other end of the spectrum is an extremely robust system with vast system resources, but a high latency associated with directory service lookup operations. In that situation, the predefined limit should be set relatively high to reduce to maximize the number of individual directory service lookup operations that can be batched together, thereby minimizing the number of successive calls that must be made to the directory service.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. In an email system that supports distribution lists, wherein the distribution lists have a root and members comprising one or more mailbox recipients and/or one or more other distribution lists and are related to one another in a hierarchical, parent-child relationship, and wherein the email system includes a connection manager having a directory service request queue for managing communications between the email system and a directory service, an improved method of expanding the distribution list comprising:

a. a step of generating a directory service lookup request for the root of the distribution list, wherein the lookup request is assigned a lowest priority, and placing the directory service lookup request in the directory service request queue;

b. a step of pulling up to a predefined number of directory service lookup requests from the directory service request queue and transmitting them to the directory service for processing, wherein the predefined number of directory service lookup requests are pulled from the directory service request queue in the order of their assigned priorities;

c. a step of analyzing the results returned by the directory service in response to the predefined number of directory service lookup requests, and
  i. for each mailbox recipient returned by the directory service in response to the previous predefined number of directory service lookup requests, saving each such mailbox recipient;
  ii. for each other distribution list returned by the directory service in response to the previous predefined number of directory service lookup requests, performing circular reference detection and discarding the other distribution list if a circular reference is detected;

d. a step of generating, for each other distribution list returned by the directory service in response to the predefined number of directory service lookup requests, a new directory service lookup request, wherein the new directory service lookup request is assigned a priority equal to one level higher than the priority associated with the previous lookup request in response to which the other distribution list was returned; and e. a step of repeating steps (b) through (e) until all mailbox recipients included in the root distribution list have been determined and saved.

2. The method of claim 1 wherein the predetermined number of directory service lookup requests is user defined.

3. The method of claim 2, wherein the step of performing circular reference detection comprises:
  a. a step of associating, with each directory service lookup request for a distribution list, a stack containing the names of all progenitors of the distribution list; and
  b. a step of comparing the names of any other distribution lists returned by the directory service with the names contained in the stacks associated with the directory service lookup request in response to which said other distribution list was returned.

4. A computer program product for use with an email system that supports distribution lists, wherein the distribution lists have a root and members comprising one or more mailbox recipients and/or one or more other distribution lists and are related to one another in a hierarchical, parent-child relationship, and wherein the email system includes a connection manager having a directory service request queue for managing communications between the email system and a directory service, the computer program product comprising a computer-readable medium having stored thereon computer-executable instructions for performing the steps of:

a. a step of generating a directory service lookup request for the root of the distribution list, wherein the lookup request is assigned a lowest priority, and placing the directory service lookup request in the directory service request queue;

b. a step of pulling up to a predefined number of directory service lookup requests from the directory service request queue and transmitting them to the directory service for processing, wherein the predefined number of directory service lookup requests are pulled from the directory service request queue in the order of their assigned priorities;

c. a step of analyzing the results returned by the directory service in response to the predefined number of directory service lookup requests, and
  i. for each mailbox recipient returned by the directory service in response to the previous predefined number of directory service lookup requests, saving each such mailbox recipient;
  ii. for each other distribution list returned by the directory service in response to the previous predefined number of directory service lookup requests, performing circular reference detection and discarding the other distribution list if a circular reference is detected;

d. a step of generating, for each other distribution list returned by the directory service in response to the predefined number of directory service lookup requests, a new directory service lookup request, wherein the new directory service lookup request is assigned a priority equal to one level higher than the priority associated with the previous lookup request in response to which the other distribution list was returned; and e. a step of repeating steps (b) through (e) until all mailbox recipients included in the root distribution list have been determined and saved.

5. The computer program product of claim 4 wherein the predetermined number of directory service lookup requests is user defined.

6. The computer program product of claim 5, wherein the step of performing circular reference detection comprises:
  a. a step of associating, with each directory service lookup request for a distribution list, a stack containing the names of all progenitors of the distribution list; and
  b. a step of comparing the names of any other distribution lists returned by the directory service with the names contained in the stacks associated with the directory service lookup request in response to which said other distribution list was returned.

7. In an email system that supports distribution lists, wherein the distribution lists have a root and members comprising one or more mailbox recipients and/or one or more other distribution lists and are related to one another in a hierarchical, parent-child relationship, and wherein the email system includes a connection manager having a directory service request queue for managing communications between the email system and a directory service, a system for expanding the distribution list comprising:

a. means for generating a directory service lookup request for the root of the distribution list, wherein the lookup request is assigned a lowest priority, and placing the directory service lookup request in the directory service request queue;

b. means for pulling up to a predefined number of directory service lookup requests from the directory service request queue and transmitting them to the directory service for processing, wherein the predefined number of directory service lookup requests are pulled from the directory service request queue in the order of their assigned priorities;

c. means for analyzing the results returned by the directory service in response to the predefined number of directory service lookup requests, and
  i. for each mailbox recipient returned by the directory service in response to the previous predefined number of directory service lookup requests, saving each such mailbox recipient;
  ii. for each other distribution list returned by the directory service in response to the previous predefined number of directory service lookup requests, performing circular reference detection and discarding the other distribution list if a circular reference is detected;

d. means for generating, for each other distribution list returned by the directory service in response to the predefined number of directory service lookup requests, a new directory service lookup request, wherein the new directory service lookup request is assigned a priority equal to one level higher than the priority associated with the previous lookup request in response to which the other distribution list was returned; and e. means for repeating steps (b) through (e) until all mailbox recipients included in the root distribution list have been determined and saved.

8. The system of claim 7 wherein the predetermined number of directory service lookup requests is user defined.

9. The system of claim 8, wherein the means for performing circular reference detection comprises:

a. means for associating, with each directory service lookup request for a distribution list, a stack containing the names of all progenitors of the distribution list; and b. means for comparing the names of any other distribution lists returned by the directory service with the names contained in the stacks associated with the directory service lookup request in response to which said other distribution list was returned.

* * * * *